FIG. 2b

United States Patent Office 3,311,886
Patented Mar. 28, 1967

3,311,886
SAMPLING MULTIPLEXER WITH PROGRAM CONTROL
Robert W. Herman and Harry V. Hilker, Orange County, Calif., assignors to Decision Control, Inc., a corporation of California
Filed Sept. 18, 1962, Ser. No. 224,897
6 Claims. (Cl. 340—172.5)

This invention relates to devices for sampling and, more particularly, to a system for multiplexing a plurality of sampling signal sets according to a variable program control.

Sampling devices of the general type contemplated by the present invention are required wherever a computer or data processing system operates upon information signals from a plurality of channels or sources, where such information varies in amplitude or digital value at differing rates depending upon the source.

A typical application requiring such a sampling device is the one which will be considered in detail herein and which is specifically programmed for in the specific serial embodiment of the invention which is described. In this case five types of information sources are involved, these are: vibration which must be measured 2000 times per second; thrust components which must be measured 200 times per second; a first pressure measurement requiring measurements at a 100/sec. rate; a second pressure measurement requiring measurements at a 50/sec. rate; and first and second temperature measurements at 20/sec. and 10/sec. measurement rates, respectively.

In the illustrative example, two channels of information must be sampled for the vibration signals, nine channels for the thrust, 12 channels for the first pressure measurement, ten channels for the second pressure measurement, and 20 and ten channels for the first and second temperature measurements, respectively.

If this sampling problem were to be approached with conventional equipment several limitations would be noted immediately. The conventional device has a fixed information subdivision rate. That is, only rates which differ by multiples of ten (for example) may be provided by a single device. This means, for the present case, that only the 2000/sec., 200/sec., and 20/sec. can be handled by one conventional sampling device and it must have its own sampling pulse generator.

Another limitation of the prior art systems is that once set to a particular subdivision rate such as submultiples of ten, the rate cannot be changed without changing the structure and different submultiple rates cannot be achieved without structural changes. In other words, the conventional technique does not permit variable rate submultiple programming as is contemplated by the present invention.

A further limitation upon the prior art approach is inherent in the fact that variable rate programming is not possible. This is the fact that rigid rate submultiple specifications will make it impossible for many applications to achieve a high degree of sampling pulse utilization. Thus, in the present case of illustration it is assumed that the system single sampling pulse generator operator operates at a frequency of 12,500 pulses per second and that all submultiple rates must be derived from this single source. It will be recognized as this discussion proceeds that the restriction to a single source disqualifies the conventional technique immediately and that the use of multiple sources and fixed submultiple rate conventional devices will not yield the same degree of usage of the sampling pulse intervals. Thus the novel approach herein makes possible 100% utilization of the sampling pulses under some conditions with proper programming of the sampling submultiple rates, all of which are derived from the same single source of sampling pulses.

Accordingly, it is a general object of the present invention, to provide an improved sampling device which can be programmed to permit varying submultiple sampling rates derivable from the same pulse source.

Another object is to provide a versatile sampling multiplexer with provision for programming of sampling rates and channels to be sampled at particular rates.

A further object of the invention is to provide a simple serial sampling device that may be programmed for varying submultiple rates.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIGS. 2a and 2b are a chart illustrating the manner in which the invention operates to provide variable rate sampling for a typical example;

Figure 1:
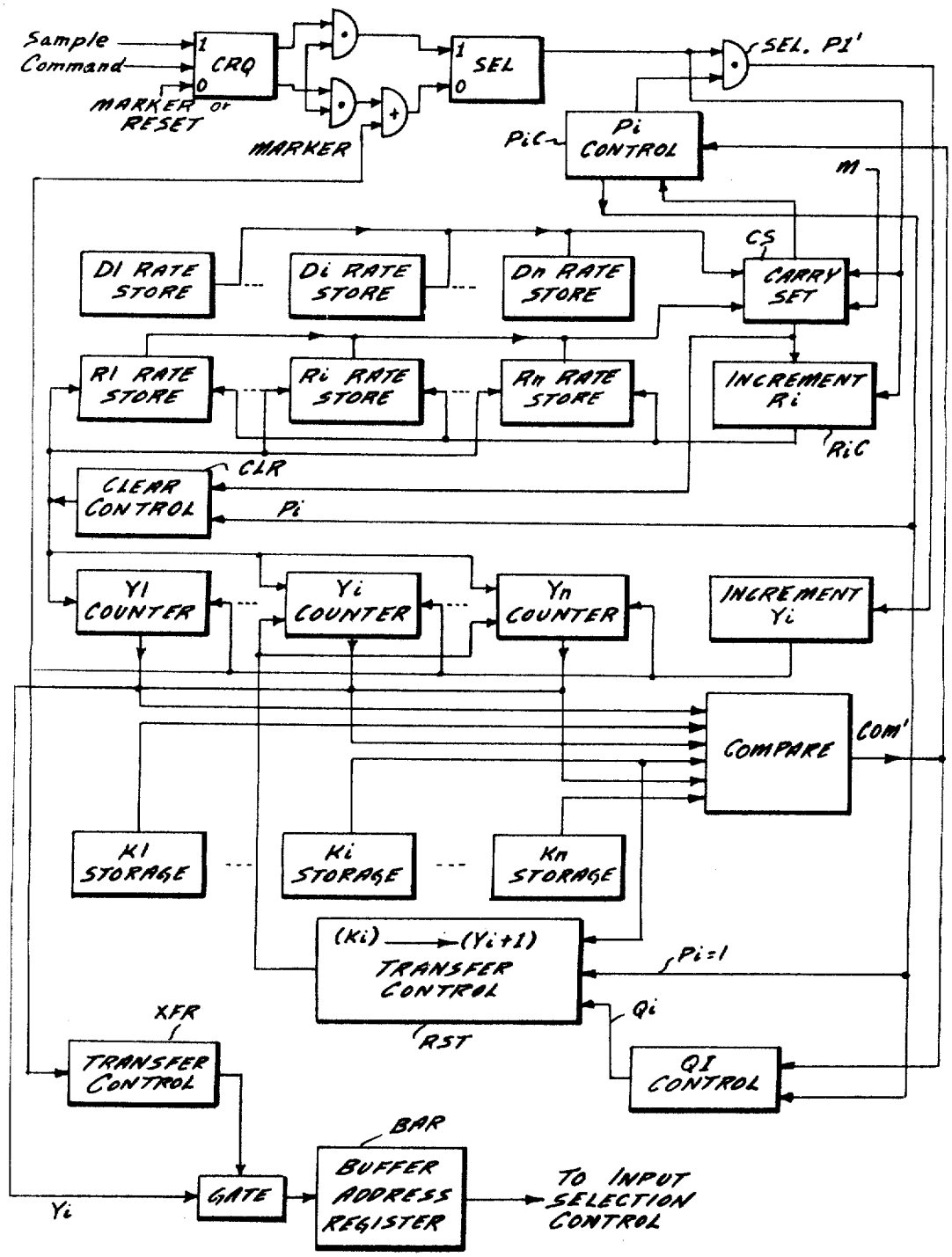
FIG. 1 is a block diagram of a sampling system according to the present invention.

Referring is now made to FIG. 1 wherein it will be noted that a Sample Command signal is applied to a flip-flop CRQ to set this flip-flop to its binary 1 or true state upon receipt thereof. The sample command signal may have a repetition rate of 12,500/sec. as is assumed for the particular illustration of the invention's operation herein.

Before considering further details of the structure of the arrangement it will be helpful in developing an understanding of the invention to consider a particular example of usage so that each of the various means shown in FIG. 1 may be described with respect to its function for this example.

The hypothetical sampling requirement is set forth as follows:

| No. of Channels | Function | Desired response |
|---|---|---|
| 2 | Vibration | 2,000/sec. |
| 9 | Thrust components | 200/sec. |
| 12 | Pressure | 100/sec. |
| 10 | do | 50/sec. |
| 20 | Temperature | 20/sec. |
| 10 | do | 10/sec. |

After consideration of the hypothetical example, it will be shown that in its generalization, the invention contemplates subdivision of a N pulse scan by submultiples defined by the relationship:

$$N = 2^k \cdot 3^m \cdot 5^n \cdot 7^p \ldots$$

This relationship specifies that any number of time "slots" may be filled by submultiple division of powers of prime numbers such as 2, 3, 5 and so forth.

For the purpose of the present example powers of two primes 2 and 5 will be employed to subdivide a sampling rate (N) of 12,500 pulses per second. A set of five compatible sample rates suitable for the above hypothetical sampling requirement may then be chosen as follows:

```
12,500→2,500→500  100  20  4       Divide by 2
       ↓
 6,250  1,250  250→ 50  10  2           ↓
                ↓
 3,125   625   125  25   5  1
Divide by 5—→
```

These five samples rates are then used to best correspond to the hypothetical desired response, as follows:

| Channel No. | Function | Sample rate | Capacity |
|---|---|---|---|
| 2 | Vibration | 2,500/sec | 2·2,500= 5,000 |
| 9 | Thrust component | 250 | 9·250= 2,250 |
| 12 | Pressures | 250 | 12·250= 3,000 |
| 10 | do | 50 | 10·50= 500 |
| 30 | Temperatures | 25 | 30·25= 750 |
| Total slots filled | | | =11,500/sec. |

The above table of sample rates defines a program. Since certain codes must be established to define this program, the following system of notation is adapted which is used in the program table below as well as in the various figures herein:

$Di$=a binary digit having a value of 1 when the rate division is to be 5 and having a value of 0 when the rate division is to be 2.

$Ki$=a six binary digit code (two octal) which represents the last channel in a series which is to be sampled at a particular rate (the "$i$th" rate).

$Yi$=a six binary digit code (two octal) which represents the address of the present channel to be sampled at rate $i$. When $Yi=Ki$, last channel address of $i$th rate is sampled.

$Ri$=a submultiple counter, there being one for each of the rates, whether used or not. When $Di=1$, $Ri$ (three binary digits) overflows after 5 counts, when $Di=0$, after 2 counts.

$Ci$=overflow marker for $Ri$ counter to provide count for $Ri+1$ counter.

$Pi$=marker which is set after $Yi=Ki$, where $Yi$ address are incremented successively until equality occurs. After $Pi=1$ no sampling is performed at particular rate until overflow marked by $Ci$ occurs which sets $Pi$ to zero.

$Qi$=special marker to indicate condition where $Yi=Ki$ and $Ci$ is produced.

The special program which will be considered below may be represented as follows:

Thus K2 is equal to K1 so that the channel selection is considered to be finished before it starts. Rate 3 is obtained by dividing 500 by 2 to provide 250/sec. with a frequency of usage of one pulse out of each 50. Rates 4 and 5 are obtained by dividing by 5 and 2, respectively, with rate 5 being used for all temperature scans at a rate that is higher than the maximum required for this case.

The general functioning of the invention will now be discussed with reference to FIG. 1. A Sample Command signal, corresponding to each of the 12,500 sample pulses, is applied to flip-flop CRQ to set it to binary 1. Flip-flop CRQ is set to zero or its false state by a marker pulse or reset signal, and the output signals of this flip-flop, referred to logically as CRQ and CRQ' for the true and false state representation are shifted into a flip-flop SEL. The purpose of the two flip-flops CRQ and SEL is to permit the system of the invention to be operated asynchronously with the sample command signals, the marker signals being produced synchronously with the system of FIG. 1. If the invention is mechanized as a completely parallel system, however, only a single flip-flop is required to indicate that a sample command has been made.

When flip-flop SEL has been set to its binary 1 or true state a true signal is developed by and gate SELP$i'$ if the marker P$i$ is a zero. This signifies that the particular $i$th rate scan has not been completed since P$i$ is zero and accordingly two basic functions are performed: the Y$i$ code is incremented (starting initially from zero) and transfer control XFR is turned on to control the reading out of the first channel address (000001). A comparison is performed at the same time to determine if $Y1=K1$ by means COM which produces an output signal having a binary 1 state when $Yi<Ki$. Since K1 is 2 the first comparison produces a binary 1 indicating that another channel should be read at the first rate.

The second operation is like the first except that Y1 becomes equal to K1 so that signal COM is then a binary 0. This occurrence is employed to set P1 to 1 in P$i$ Control device P$i$C so that channel selection for the first rate is not resumed until P1 is later set to zero when signal C1 is generated. This is after five sample commands which cause the overflow of counter R1.

| $i$ | Rate | No. Channels | Channel #'s | Rate Divisor | $Di$ | $Ki$ | Freq. |
|---|---|---|---|---|---|---|---|
| 1 | 2,500/sec | 2 | 1, 2 | 5 | 1 | 2 | ⅕ |
| 2 | 500/sec | 0 | | 5 | 1 | 2 | 1/25 |
| 3 | 250/sec | 21 | 3 ... 23 | 2 | 0 | 23 | 1/50 |
| 4 | 50/sec | 10 | 24 ... 33 | 5 | 1 | 33 | 1/250 |
| 5 | 25/sec | 30 | 34 ... 63 | 2 | 0 | 63 | 1/500 |

Each sampling rate is obtained from the previous rate through the designated divisor. The first ($i=1$) is obtained from the basic 12,500 sampling rate by dividing by 5 to yield the 2500/sec. sampling rate. This provides a frequency of sampling of 1 sample for each five pulses, thus the Freq. term of ⅕. Rate 2 is obtained by dividing 2500 by 5 to yield 500 which is not used in the example.

Figure 2A:
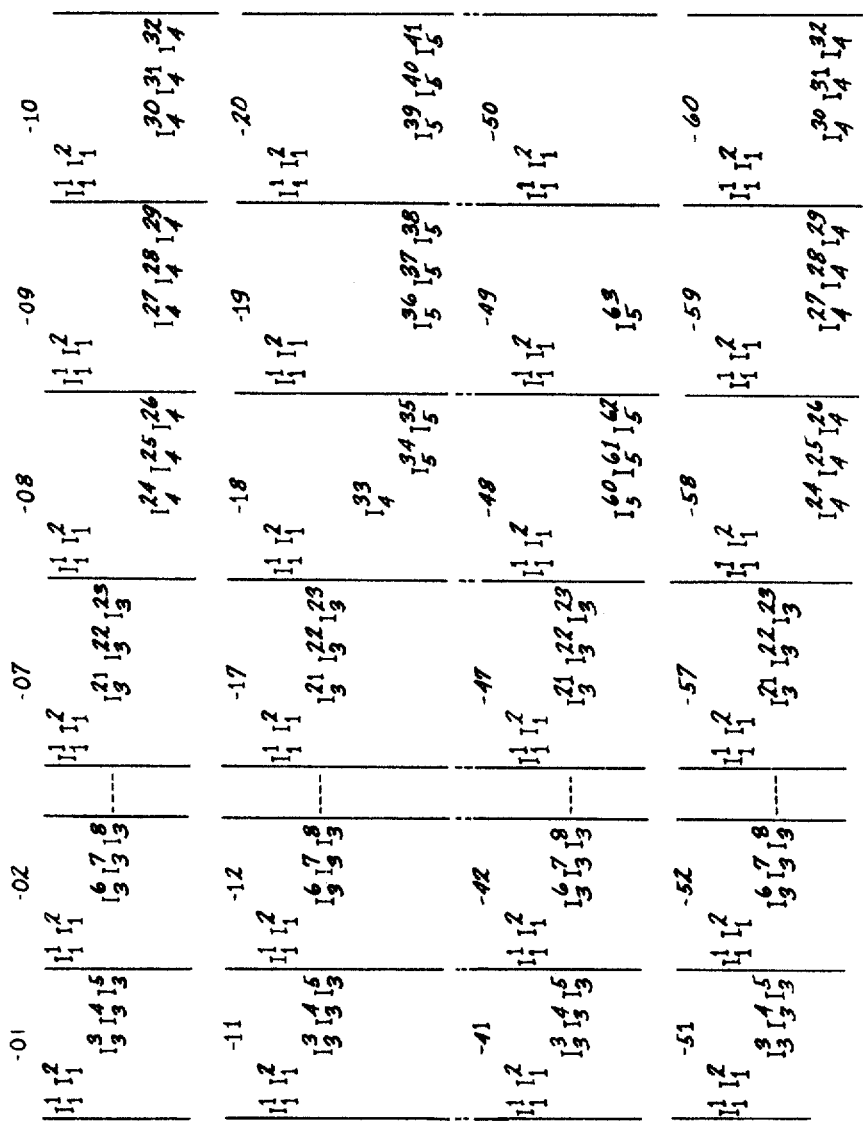
Figure 2B:
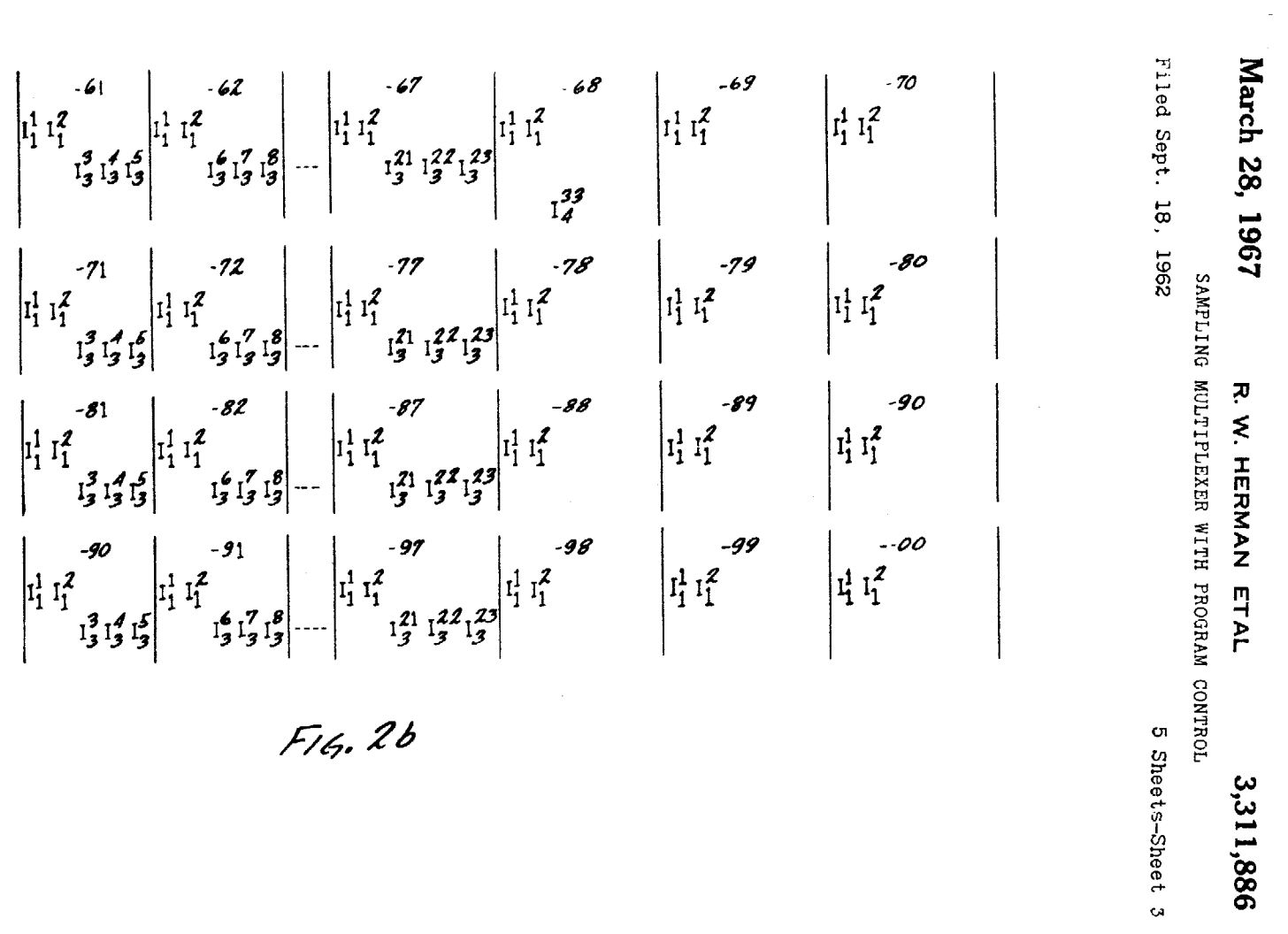

Before completing the discussion of the functions of the structure of FIG. 1 it will be helpful to consider the sequence diagram of FIG. 2. In this figure one-twenty-fifth of a scan (12,500 pulses per scan) is illustrated. Each channel input is identified as $I_i^y$ where $i$ represents the rate and $y$ the channel address. Thus the samples $I_1^1$ and $I_1^2$ correspond to the first two samples mentioned above during which time Y1 address (2) are sampled.

As soon as the first rate is complete a compare signal COM' is generated by comparison means COM of FIG. 1 and P1 is set to 1 to terminate the channel selection operation for the first rate. P2 has already been set to 1 by means which will be discussed below with reference to the specific embodiment of FIG. 3, so that the next channel selection addresses are selected by P3'SEL which operates as before to actuate the increment Yi control which in turn actuate XFR to transfer the Y3 augmented address to the Buffer Address Register (BAR of FIG. 1).

Since the first Y3 address is equal to K2, provision is made according to the invention to turn on Transfer Control means RST shown in FIG. 1 as soon as P1 was set to 1. Actually this transfers K1 to the Y3 counter, but in our example $K1=K2$. In FIG. 1 the Transfer Control RST is considered to have the function $(Ki)+1 \rightarrow (Yi+1)$, which means that we must augment K1 (address 2 in our example) by one to produce the first Y3, address 3 in our example for rate 3.

After three of rate three inputs ($I_3^3$, $I_3^4$ and $I_3^5$) are sampled a total of five sample commands have been executed so that counter R1 is caused to overflow to produce C2. Each overflow and carry generating operation is effective, according to the invention, to set the carry over to the next counter through means $C_s$ of FIG. 1 and to then set $Pi$ to zero. Thus, in our example, P1 is set to zero so that the next sample command is effective to read the first address of Y1 and the cycle of five samples in section $-01$ of FIG. 2 is then repeated in sections $-02$ through $-07$.

At the end of section $-07$ in FIG. 2 input $I_3^{23}$ is sampled which results in $Y3=K3$ so that signal COM' is generated setting P3 to 1. This terminates the scan of rate 3 channels. At the same time Counter R1 overflows for the 7th time and resets P1 to zero to initiate the rate 1 sample of $I_1^1$ and $I_1^2$. In section $-08$, P3 is still a binary 1 so that sampling of rate 4 begins with $I_4^{24}$, $I_4^{25}$ and $I_4^{26}$. This sampling of the two rate 1 inputs and three rate 4 inputs in successive order continues through section $-10$. This completes ten overflow counts of $R^1$ into $R^2$ so that at this time both carries C2 and C3 are set as the counters return to zero and control bits P1 and P2 are both reset to zero.

Sections $-11$ through $-17$ of FIG. 2 are the same as $-01$ to $-07$. In section $-18$ the last sample of rate 4, namely $I_4^{33}$, which causes Y4 to equal K4 to set P4 to 1 and terminate the forth rate sampling for this period. The sampling for rate 5 then commences immediately with $I_5^{34}$ and $I_5^{34}$ in section $-18$. Cycles for rates 1, 3 and 5 are then continued through section $-50$. Sections $-51$ through $-60$ are identical with $-01$ to $-10$, and sections $-61$ through $-00$ as far as rates 1, 3 and 4 are concerned. Since the frequency of sampling of rate 5 is ⅕₀₀, this sampling does not begin a new cycle until section 118, the repeats each 100th section: 218, 318, and so forth until the last cycle which is 2418.

In this manner each of the sections of FIG. 2 is repeated 25 times for the particular example, the total number of samples being $5 \times 100 \times 25$ or 12,500.

The over-all operation of the invention for the particular example of FIG. 2 will now be reviewed with reference to both FIGS. 1 and 2 and the various charts introduced above. In the operation, digits for $Di$ and $Ki$ are entered into appropriate storage in devices D1 ... Di ... Dn and K1 ... Ki ... Kn shown in FIG. 1. In the serial system of FIG. 3 these storage devices are obtained through the use of a single delay type of circulating register which will be discussed further below. An initial operating cycle is performed which is explained in detail below for setting the proper values for $Pi$. In the example illustrated P2 is set to 1 because $K2=K1$ which cause COM' to occur immediately, the other $Pi$ signals (P1, P3, P4, P5) are zeros.

Provision is made through means CLR of FIG. 1 to set Y1 to zero initially. This is accomplished by routing a control signal P1 from device $PiC$ to Clear Control CLR. Since P1 is a 0, Inputs $I_1^1$ and $I_1^2$ are sampled as mentioned before, the rate sampling being terminated when COM' is generated by means COM which sets P1 to 1.

Each sampling command signal actuation of device SEL causes a control signal to be applied to $Ri$ increment control device $RiC$ which adds one to R1 counter for each sample pulse and one to each of the other counters R2–R5 for the particular example when a carry or overflow signal is generated. In the specific serial embodiment of the invention illustrated in FIG. 3, the carry over signal is introduced first into Clear Control CLR which is them employed to set the carry $Ci$ at the appropriate time.

The clear control and carry setting function is performed in the serial embodiment of the invention by detecting the state of $Di$ and its associated count. If $Di=1$, the subdivision is to be 5 so that the presence of binary 100 in $Ki$ means that the count will cause the overflow to $Ci+1$. If $Di=0$ the presence of binary 001 in $Ki$ signifies that an overflow is due on the next count.

The only remaining general function of the structure of FIG. 1 is that of the $Qi$ control. This is a special control that is required for cycles where signal COM' is produced at the same time as a signal $Ci$. This could occur, for example, if only a single sampling rate of 2500/sec. were programmed for each of five channels. Thus the sampling sequence would be simply: $I_1^1$, $I_1^2$, $I_1^3$, $I_1^4$, and $I_1^5$. Since five samples will cause the overflow for counter R1 at the same time $Y1=K1(5)$, a double $Pi$ control is present where COM' tends to set $Pi$ to 1 and $Ci$ tends to set it to 0. This ambiguous situation is identified by setting a $Qi$ control signal to a binary one or true state whenever the condition COM'$Pi'$ is true and by letting the $Ci=1$ control determine the state of $Pi=0$. The $Qi$ signal is then used to actuate device RST to effect the desired of the $Ki-1$ code to $Yi$. In this connection it will be noted that FIG. 1 specifies the transfer of $(Ki)+1$ to $(Yi+1)$ which is shown as the generic formula. In the specific serial embodiment of the invention illustrated in FIG. 3, however, it is more convenient to perform the resetting transfer as soon as $Pi$ is set to 1 after COM' becomes true on the equality $Ki=Yi$ or under control of the $Qi$ signal. In other embodiments it may be more convenient to effect transfer according to the generic formula.

Figure 3:
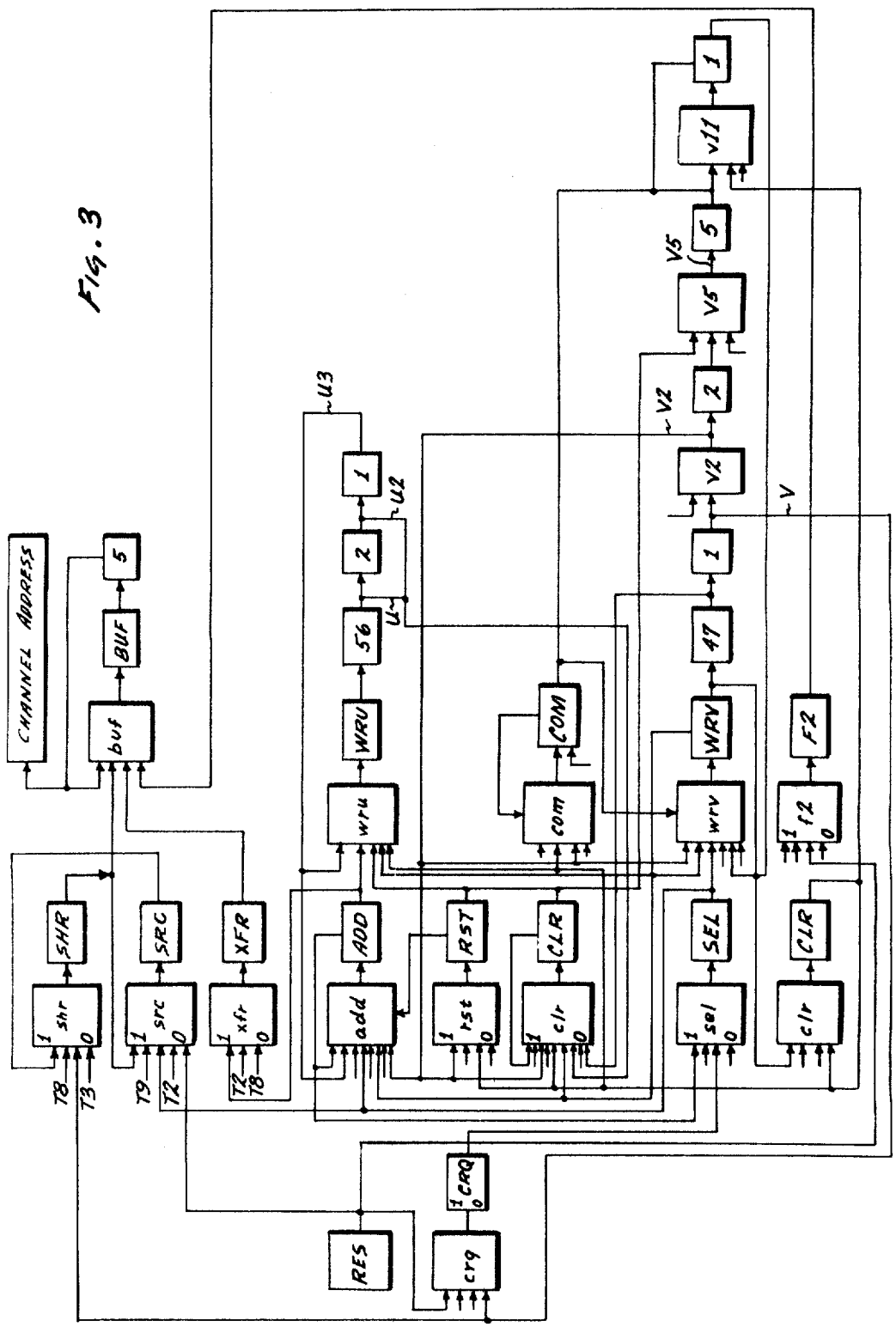
FIG. 3 is a block and partial schematic diagram of a serial type sampling system according to the present invention.
Figure 4:
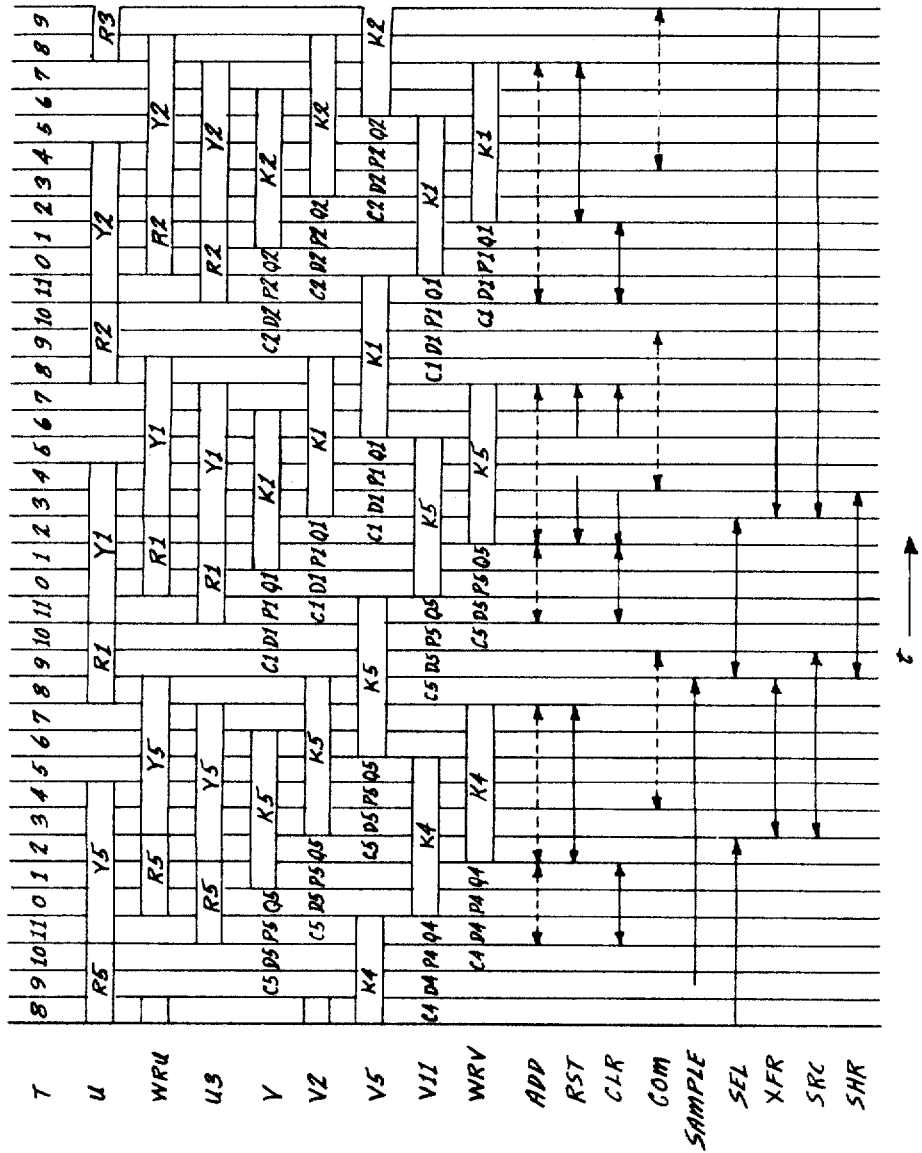
FIG. 4 is a composite timing diagram illustrating the operation of the embodiment of FIG. 3.

Reference is now made to FIGS. 3 and 4 for a description of the serial embodiment of the invention. FIG. 3 is mechanized according to the following equations.

LOGICAL EQUATIONS FOR THE EMBODIMENT OF FIG. 3.

(1) $add = \overset{\text{Hold}}{ADD.RST'}.\overset{(Ri, Yi)}{U3.T7'} + \overset{Ri\ start}{WRV.T10} + \overset{Yi\ start}{SEL.T1}.\overset{Pi'}{V2'}$ (2) $1rst = \overset{Pi}{V2.T1} + \overset{Qi}{V1.T1} + \overset{Initial\ Pi\ setting}{F1'.F2.T1}$
$0rst = T7$ (3) $clr = F1'(\overset{Hold}{CLR.T1'.T7'} + \overset{2\ cycle}{U2.V'.WRV.T10} + \overset{5\ cycle}{U.V.WRV.T10} + \overset{Initial\ Clear}{V2.V6.T1})$ 
$\quad Ri=100Di'Ci-1 \quad Ri=001Di\ Ci-1 \quad Pi.M=Pi$

LOGICAL EQUATIONS FOR THE EMBODIMENT OF FIG. 3.—Continued (4) $wru = F1'[RST'CLR'(ADD'U3+ADD.U3') + RST(CLR'\overset{\text{enter Ki-1}}{WRV} + \overset{\text{add 1 for Qi=1}}{ADD})]$ 
   (Increment Rj, Yi)

(5) $com = [COM(\overset{K1}{V2} + \overset{Yi'}{WRU'}) + \overset{Ki}{V2}.\overset{Yi'}{WRU'} + F1]T2'$  $COM'.T9=1$ means $Yi=Ki$ (6) $1sel = CRQ.V1.T8$
   $0sel = CRQ'\overset{M}{V1}.T8+ADD.T2$ (7) $v2 = V1(COST)' + (S\overset{\text{Di \& Ki input}}{U})(COST)$ (8) $v5 = \overset{\text{Clear Ci \& Qi}}{\longrightarrow V4.T1'T4'} + \overset{\text{Set Ci}}{CLR.T1}\longleftarrow$ (9) $v11 = V10.T9' + T9[\overset{\text{Set or hold Pi}}{Pi.Ci'} \overset{Yi=Ki\ Pi\ Ci'}{V10.V12'F1'} + COM'(V10+V12')]$

(10) $wrv = V12(T9'+V2') + COM3'\overset{\text{Clear C5}}{WRV''T0} + \overset{\text{Set Qi}}{SEL}.\overset{\text{Set C5}}{\overset{M}{V2}.T9}$  for R1 count

(11) $1crq = $ (Sample Command)
   $0crq = V1.\overset{M}{T8} + RES$

(12) $1f1 = (COST)$
   $0f1 = WRV.\overset{M}{T8}.F2$

(13) $1f2 = (COST)(SU).\overset{M\ \text{insert}}{T8}$
   $0f2 = V5.T0.\overset{M\ \text{terminate input}}{F1'} + RES$

(14) $1src = SEL.T2$
   $0src = SHR.T9 + RES$

(15) $buf = F2'(BUF5.SHR'XFR' + WRU.XFR)$

(16) $1xfr = ADD.T2$
   $0xfr = T8$

(17) $1shr = SRC.\overset{M}{V1}.T8$
   $0shr = T3$

The logic for the system of FIG. 3 will be explained by discussing the relationship between the various logical functions and the exemplary operation of FIG. 2.

Whenever a sample command is received flip-flop CRQ is set to binary 1 (see Equation 11) by the logic: $1crq = $ (Sample Command). This occurs in the example at the 12,500/sec. pulse rate. Flip-flop CRQ remains on until the marker M appears at time T8 in flip-flop V1 which sets flip-flop SEL according to Equation 6 as follows: $1sel = CRQ.V1.T8$.

It is assumed that the timing signals T0 through T11 employed in the logic are generated by an external source which is not shown since it is conventional. At time T1 after T8.V1(M) has set SEL, flip-flop ADD is turned on by the logic of Equation 1: $add = SEL.T1.V2'$. Once the ADD flip-flop is turned on it is held by the term: $add = ADD.RST'.U3.T7'$. This operation is accomplished by using a delay type of flip-flop which can be sustained in the "on" state by feeding back its output signal (ADD in this case) conditioned upon other logic. The result is an effective holding contact relay which is released by breaking the holding circuit. Since the feedback requires that all three terms be satisfied $RST'=1$, $U3=1$, and $T7'=1$, any one of these will terminate the one state of the flip-flop. The addition logic will be more fully described below with examples.

The term $add = WRV.T10$ operates in the same manner as SEL.T1.V2' introduced above but relates to the setting of the ADD flip-flop to add a carry from one R$i$ counter to the next. The first carry to R1 must be forced. This is accomplished by the term $wrv = SEL.V2.T9$ in Equation 10. Thus the receipt of a Sample Command signal actuates a control sequence which augments Y$i$ if $Pi=0$ in V2 at time T1 and which forces a carry $Ci-1=C5$ for the incrementing of R1.

In logical terms, flip-flop ADD is the carry flip-flop for an addition which produces a sum entered into flip-flop WRU by the logic of Equation 4:

$$wru = RST'CLR'(ADD'U3 + ADD.U3')$$

The F1' multiplier is omitted for the present discussion for simplicity and will be considered below as part of input.

In the addition operation U3 representing either R$i$ or Y$i$ is being added to 1 which is preset into the ADD flip-flop either by the Y$i$ augment control term:

$$add = SEL.T1.V2'$$

or by the R$i$ augment control term: WRV.T10. Reference to FIG. 4 shows that setting of a carry at time T1 to be on starting with T2 is appropriate for adding 1 to U3 representing the least significant bit of Y$i$ at the time; and that setting a carry to 1 at time T10 to be on at T11 puts the carry in phase with the following R$i$ least significant bit.

Before proceeding with the logic description it will be helpful to consider the general form of the embodiment of FIG. 3 along with the operation depicted in FIG. 4. It is assumed in this example that the clock period is one microsecond so that each 12-phase clock period T0 through T11 mentioned above comprises 12 microseconds. Since there are five different rates for the illustrative problem the total recirculation period for the $wru$ and $wrv$ loops is $12 \times 5 = 60$ microseconds. These delays are indicated in the notation which is employed herein and in the block diagram of FIG. 3. In examining the $wrv$ loop it will be noted that a 1-pulse delay occurs in flip-flop WRV, a 47 pulse interval delay in the line which WRV drives, a 1-pulse delay to produce V1 following the output of the line referred to as V, a 1-pulse delay in V2 to produce signal V2 delayed by 2 from V, a 2-pulse delay in series with V5 with a 1-pulse delay to produce signal V5 which is delayed 5 from V, and a five bit delay in series with the 1 bit of V11 to produce signal V11 delayed 11 from V. The total of all delays in the loop will be observed to be: $1+47+1+1+2+1+5+1+1 = 60$. In the case of the $wru$ loop, WRU introduces one delay, the line is 56 delays, and U3 is produced by a 3-bit delay following the U output of the line.

A few examples may serve to clarify the addition process. At the start of the sampling operation $Y1 = 0\ 0\ 0\ 0\ 0\ 0$ and $K1=0\ 0\ 0$. The first addition process appears as follows:

| | t⟶ | | | | | | | | | | |
|---|---|---|---|---|---|---|---|---|---|---|---|
| T | 9 | 10 | 11 | 0 | 1 | 2 | 3 | 4 | 5 | 6 | 7 | 8 |
| ADD | | | | 1 | 0 | 0 | 1 | 0 | 0 | 0 | 0 | 0 |
| | | | | R₁ | | | Y₁ | | | | | |
| U3 | | | | 0 | 0 | 0 | 0 | 0 | 0 | 0 | 0 | 0 |
| | | | | R₁ | | | Y₁ | | | | | |
| WRU | | | | | 1 | 0 | 0 | 1 | 0 | 0 | 0 | 0 |

In this first example R1 and Y1 start from 000 and 000000, respectively and are augmented to 100 and 100000, respectively. The R1 augmentation is caused by the turning on of ADD by the function $add=WRV.T10$ and the Y1 augmentation is caused by the turning on of ADD by the function $add=SEL.T1.V2'$. It will be noted that the WRU output is delayed one time interval due to the flip-flop delay. The *wru* input function is the sum of ADD and U3.

In the next example which occurs during the processing of $I_3{}^6$ of FIG. 2, $R1=110$ and $Y1=011000$.

| | t⟶ | | | | | | | | | | |
|---|---|---|---|---|---|---|---|---|---|---|---|
| T | 9 | 10 | 11 | 0 | 1 | 2 | 3 | 4 | 5 | 6 | 7 | 8 | 9 |
| ADD | | | | 1 | 1 | 1 | 1 | 0 | 0 | 0 | 0 | 0 | 0 |
| | | | | R₁ | | | Y₁ | | | | | | |
| U3 | | | | 1 | 1 | 0 | 0 | 1 | 1 | 0 | 0 | 0 | |
| | | | | R₁ | | | Y₁ | | | | | | |
| WRU | | | | | 0 | 0 | 1 | 1 | 1 | 1 | 0 | 0 | 0 |

When $R1=001$ for the case where $D1=1$ in our example it is necessary to reset the next R1 to 000 and to generate a $C1=1$ which is carried to the next counter R2. The state $D1=1$ represents a count cycle of 5, whereas a $D1=0$ would represent a count cycle of 2. The generic resetting logic for $Ri$ is found in Equation 3 as follows:

$$clr=U2.V'.WRV.T10+U.V.WRV.T10$$

Flip-flop CLR is thus turned on at time T10 for either of these conditions and therefore causes an entry of zeros into WRU until turned off by release of the holding term: $clr=CLR.T1'.T7'$, which is effective at time T1 in this case.

The remaining term in *clr* which has not been considered is:

$$clr=V2.V6.T1$$

This is for the initial clear of Y1 to zero when $$P1=1(Pi.M=P1)$$

CLR is on for this case from T2 through T7 when the holding circuit releases. For the other cases Y$i$ is replaced by $Ki-1$ by entering WRV into *wru* under the control of RST. In the special case where the scan is complete and $Qi=1$ which is considered further below, binary 1 is added to $Ki-1$ which in this special case is all zeros. The logic for the $Ki-1$ entry is:

$$wru=RST(CLR'WRV+ADD)$$

The RST control for the $Ki-1$ entry for either $Pi=1$ or $Qi=1$ is defined by the logic:

$$1rst=V2.T1+V1.T1$$
$$0rst=T7$$

Since RST is reset by T7 it remains in a zero state if P$i$ and Q$i$ are zero and thus properly controls the addition process previously described. This is the situation where Y$i$ is still less than K$i$ and P$i$ has not yet been set to 1.

The P$i$ setting emanates firstly from the operation of the *com* logic:

$$com=[COM(V2+WRU')+V2.WRU']T2'$$

According to this logic flip-flop COM is zero set at T2 time and then is set to one of V2.WRU' occurs at any time thereafter, and is reset to zero if V2'.WRU occurs which is in the holding term $COM(V2+WRU')$. This means that if $COM'=1$ exists at T9 time that WRU which represents Y$i$ must be equal to K$i$ represented by V2. This logic includes the possibility that Y$i$ is greater than K$i$, but the other functions prohibit this occurrence. The corollary of this proposition is that $COM=1$ at T9 time means that K$i$ is still greater than Y$i$ and that the particular input should be sampled for further Y$i$ input addresses. It may be noted that whenever 1 is added to Y$i$ a new address for input is specified so that the transfer control to the buffer which is to control this selection is: $1xfr=ADD.T2$.

In the normal case for setting P$i$ where it is presently zero, the following logic applies: $v11=COM'V12'.T9$. (Equation 9). This states that if $Ci=0$ (not an end of scan) the occurrence of COM' at $T9=1$ means that the Y$i$ addresses for that series of inputs are now covered and the P$i$ bit is to be set to prohibit further scanning of these inputs until P$i$ is reset to zero again. The term $$v11=COM'T10.T9$$

is included to cover the case where P$i$ has already been set and is to be retained. This occurs at the start as is considered below when the functions of flip-flops F1 and F2 is considered.

Each time flip-flop CLR is on at time T1 it must have been set by the T10 logic which means that the respective R$i$ counter has overflowed and a new carry must be sent to the next higher place counter. This is accomplished by the logic in Equation 8 which is: $v5=CLR.T1$. Flip-flop V5 receives the signal of the preceding flip-flop V4 at all times except the new carry insertion time of T1 and the Q$i$ reappearance time which is T4. Thus the logic for holding is: $v5=V4.T1'T4'$.

Flip-flops F1 and F2 are used to control the input functioning of the system, reference being made to Equations 2 and 13. Flip-flop F1 is turned on by signal (COST) which is a computer output signal arranged to signal the availability of input data for the sampling system. This could, of course, be built into the same system. After F1 is turned on, register U is cleared to zero due to the F1' multiplier times all of the *wru* input logic. This clears R$i$ and Y$i$ to zero. The program information for D$i$ and K$i$ is then entered into the V line through V2 by the logic:

$$(7) \quad v2=V1(COST)'+(SU)(COST)$$

where the first term provides recirculation during (COST') and the second term provides for the input of (SU) which is the desired information.

After the V line is filled through flip-flop V2, flip-flop F2 is turned on by the marker with the function:

$$1f2=(COST)(SU)T8$$

During the time that $F1=1$, flip-flop COM is set to one by the logic: $com=F1.T2'$. to insure that all of the initial P$i$'s are zeros. Flip-flop F1 is then turned off after F2 has been turned on by the logic: $0f1=WRV.T8.F2$ (Equation 12). During the time that $F2.(COST)=1$ the unused rates have P$i$ set to 1 automatically since in this case $Ki-1=Ki$. This causes a $COM'=1$ at T9 with a carry of zero. This condition is sustained during input by the P$i$ holding logic: $v11=T9.V10.V12'.F1'$.

Q$i$ is also automatically set if the condition $$COM'.Ci=1$$

occurs. The continuous insertion of $Ki-1$ for Y$i$ is assured during the input period by the setting of RST by:

$1rst = F1'.F2.T1$. Flip-flop F2 is turned off by the marker to terminate the $F1'F2=1$ phase by the logic: (13) of $2 = V5.T0.F1'$.

Each time a SEL signal is generated as described above a flip-flop SRC is turned by the logic of Equation 14 $1src = SEL.T2$. Then a flip-flop SHR is turned on by the Equation 17 function: $1shr = SRC.V1.T8$, which syncs the buffer transfer to the marker M occurring at time T8 in V1. T8 also resets XFR by (16) $0xfr = T8$. With both SHR and XFR at zero the buffer register is controlled for recirculation by Equation 15 $buf = BUF5.SHR'XFR'$, flip-flop SHR being reset at time T3. The complete buffer recirculation and transfer logic then appears as in Equation 15:

$$buf = F2'(BUF5.SHR'XFR' + WRU.XFR)$$

where the second term enters the U loop information after XFR is set each time a SEL signal actuates the adder flip-flop ADD.

The term RES in the logic is a reset signal which permits the forced resetting of the related flip-flops.

In view of the complexity of the above logic, a summary of the inventive concepts and theory is introduced here before the claims in order to clarify the basic generic aspects of the invention which are not limited to the specific embodiment of FIG. 3.

According to the basic theory of the invention a set of compatible sampling rates can be found by establishing a prime array. In the case of the two primes 2 and 5 and a basic sample pulse rate of 12,500/sec., the prime array appears as:

```
12,500→2,500→500  100  20  4      Divide by 2
          ↓                              ↓
 6,500  1,250  250→ 50  10  2
                    ↓
 3,125   625  125   25   5  1
Divide by 5→
```

To determine the conditions for compatibility (those rates connected by the arrows in the example), consider first the conditions under which two channels will interfere. Suppose two channels $i$ and $j$ are sampled with periods $Ni$ and $Nj$, respectively, starting at relative locations $ai$ and $aj$, respectively. Then each successive sample of $i$ will occur at a position $xi$ which can be defined as $ai$ plus a modulus of $Ni$. Thus in the case of $I_1^1$ of our example of FIG. 2 $ai=1$ for the start position, and the next $xi$ equals $1+5$, where 5 is the modulus for the first rate, that is it is repeated each fifth sample.

Two rates $Ni$ and $Nj$ can interfere therefore if and only if an $xi$ position equals a $xj$ position.

This means that the following identity must be solved:

$$mNi + ai = nNj + aj$$

where the numbers $m$ and $n$ are any integers which could cause $xi$ and $xj$ to become equal.

The necessary and sufficient condition for this occurrence is that $mNi - nNj = aj - ai$, which can be derived from the above identity. As a specific example suppose that $Ni$ is 2 and $Nj$ is 5 and that the difference between $aj$ and $ai$ is 3, then $m.2 - n.5 = 3$ is possible if $m = 4$ and $n = 1$ since $4.2 - 1.5 = 3$. In fact any $aj - ai$ will result in a conflict since for any number to the right of the equality sign there exists a $m$ and $n$ combination which will provide it. For $aj - ai = 1$, $m = 3$ and $n = 1$; for $aj - ai = 2$, $m = 6$ and $n = 2$; for $aj - ai = 4$, $m = 7$ and $n = 2$; for $aj - ai = 5$, $m = 5$ and $n = 1$; for $aj - ai = 6$, $m = 8$ and $n = 2$, and so forth.

This conflict appears as long as there is no common factor between the moduli. If however, $Nj = F \times Ni$ and $aj - ai$ is not equal to $Ni$, there can not be a conflict.

For example, consider $m.3 - n.6 = 1$ or 2 or 4 or 5. In terms of a sample sequence this appears as follows:

$$I_1 I_2^1 I_2^2 I_1 I_2^3 I_2^4 I_1 I_2^5 I_2^6 I_1 \ldots$$

If $I_1$ begins at $a_1 = 1$, then $I_2$ can begin at $a_2 = 2, 3, 5, 6$ etc. The $I_2$ samples can be filled in as shown so that the actual sampling rate of two $I_2$ inputs could be made to have the same modulus (3) as $I_1$, or submultiple moduli can be accomplished where successive available slots are given to different rate inputs.

The prime array technique introduced above provides an automatic technique for providing a succession of compatible rates which, with proper selection of starting points will meet the compatibility tests given above.

From the foregoing description it should now be apparent that the present invention provides an improved sampling device which can be programmed to permit varying submultiple sampling rates which are derivable from the same sampling pulse source. It has been shown for a particular example that provision can be made for five different sampling rates to control selection from any of 63 different channels. It will be understood, of course, that the particular mechanization which has been shown in detail is merely illustrative of a large class of sampling systems which are embodied within the appended claims. The prime number moduli may, of course vary from 2 and 5. The prime array may be multidimensional. The number of rates is limited only by the structural capacity of the machine to generate the submultiple sampling frequencies. While the serial embodiment of FIG. 3 is preferred for simplicity of structure, a parallel arrangement may be preferred for high-speed sampling and is within the present contemplation of the inventors.

We claim:

1. A system for controlling the sampling of sets of input signals $Ii$ and $Ij$, set $Ii$ being sampled at rate $Ri$ and $Ij$ being sampled at rate $Rj$, said system comprising: first means for generating sampling signals for rates $Ri$ and $Rj$ such that $mNi - nNj \neq aj - ai$, where $Ni$ is a modulus related to rate $Ri$ such that a basic sampling frequency P is divided by $Ni$ to produce $Ri$, and $Nj$ is a modulus related to rate $Rj$ such that the sampling frequency P divided by $Nj \times Ni$ produces $Rj$; second means for counting the number $Yi$ and $Yj$ of input signals to be sampled in each set for $Ii$ and $Ij$, respectively; and means for producing address control signals identifying the $Ii$ or $Ij$ input signal to be sampled.

2. A sampling multiplexer with program control comprising: first means for producing sampling rate signals selected from a prime number array defined from the products of at least two of the series $2^k, 3^m, 5^n, 7^p \ldots$; second means for receiving and storing signals $Di$ identifying respective sampling rates $Ri$; third means for counting the number of input signals $Ii$ to be sampled at rates $Ri$; and means for receiving signals $Ki$ to identify the end of each signal group $Ii$.

3. A sample control system comprising: first means CRQ for receiving a sample command signal and assuming an "on" state in response thereto; second means SEL responsive to the "on" state of signal CRQ for assuming an "on" state at the beginning of a control word period; a $Pi$ control device for storing signals $Pi$ indicating the sample complete ($Pi = 1$) or sample non-complete ($Pi = 0$) state for each of a plurality of sample groups; increment $Yi$ means responsive to the logical condition SEL. $Pi'$ which is the "and" function of signals SEL and $Pi'$ for controlling the addition of binary 1; a plurality of $Yi$ counters, one for each sample rate group, each of said counters being responsive to the signal of said increment $Yi$ means for the respective $Pi$ to augment the state of the count contained therein; a plurality of means $Ki$, one for each rate, for storing the address range or range termination code for each sample group; means for comparing signals $Ki$ with said counts $Yi$ to produce a comparison signal COM' to indicate equality therebetween, said $Pi$ control device receiving signal COM' to set the state of signal P*i*; means for controlling the transfer of (K*i*) to Y*i*+1 after Y*i* augment becomes equal to K*i*; and means for generating rate submultiple sample signals as a function of a plurality of rate subdivider signals R*i* and related subdivider selection signals D*i*.

4. A programmable sample control system comprising: first means for receiving and storing sample rate subdivision codes D*i* and sample rate group number signals K*i* defining the sampling control desired; second means for providing rate counters R*i* and sample address adders Y*i*; third means for comparing Y*i* and K*i* to produce end of sample group control signals; fourth means for controlling the carry functions for each R*i* counter to provide a succession of carries from one rate submultiple counter to the next; and means for generating sampling address signal sets for each augmentation of Y*i*.

5. In a system wherein a pulse source of frequency P is used to control the submultiple generation of subfrequencies determined from the series $$P/R1 \ P/R1.R2 \ \ldots \ P/R1.R2 \ \ldots$$
$$Ri \ \ldots \ P/R1.R2 \ \ldots \ Rn$$

said system including means for receiving sample signals at said frequency P and means for addressing up to P different sample locations equal to the sum of all locations for each sampling rate use from said series of submultiple frequencies; the improvement comprising: programmable first means for receiving and storing control signals specifying each of said subdividing numbers R1 . . . R*n* and the number of locations for each group of samples for each of the subfrequencies used for samples; and second means responsive to the control signals stored by said first means for generating a sample address for each sample signal, said sample addresses being generated so that the reciprocal of said R1 . . . R*n*, N1 . . . N*n*; and the starting addresses a1 . . . a*n* of each sample for a different rate are so related that any two rates R*i* and R*j* and corresponding periods N*i* and N*j* satisfy the relationship:

$$mNi - nNj \neq aj - ai$$

where $m$ and $n$ are integers.

6. A serial sampling system comprising: first means including flip-flops CRQ and SEL for receiving sample command signals and establishing related control states corresponding to the beginning of control sequence time; second means including a flip-flop ADD and a delay line U for storing variable address Y*i* and counter R*i* for augmenting Y*i* for each sample command signalled by said first means and storing the augmented result in said U line, and for also augmenting each R*i* upon carry over from the cycle completion of the next lower R*i*, and for augmenting R*i* for each sample command; third means including a line V for storing control signals P*i* and addresses K*i* indicating the ends of respective Y*i* sample groups; and output means including flip-flops XFR and BUF for generating a sample address code for each sample command.

References Cited by the Examiner
UNITED STATES PATENTS

| | | | |
|---|---|---|---|
| 2,919,308 | 12/1959 | Cooke | 179—15 |
| 3,046,346 | 7/1962 | Kramer | 179—15 |
| 3,154,770 | 10/1964 | Schwab et al. | 340—174.1 |

OTHER REFERENCES

Associative Self-Sorting Memory, by Robert R. Seeber, Jr., in Proceedings of the Eastern Joint Computer Conference, pp. 179–188, Dec. 13–15, 1960.

ROBERT C. BAILEY, *Primary Examiner.*

I. S. KAVRUKOV, *Assistant Examiner.*